United States Patent [19]

Walloch

[11] 3,973,212

[45] Aug. 3, 1976

[54] PHASE DETECTION IN PHASE LOCK LOOP CIRCUIT

[75] Inventor: Wesley F. Walloch, Plano, Tex.

[73] Assignee: Rockwell International Corporation, El Segundo, Calif.

[22] Filed: Aug. 28, 1975

[21] Appl. No.: 608,430

[52] U.S. Cl............................. 329/122; 307/232; 307/262; 328/155; 328/127; 329/104; 331/14; 331/17
[51] Int. Cl.².......................................... H03D 3/00
[58] Field of Search ........... 329/104, 122, 124, 125; 328/155, 127; 331/14, 17; 307/232, 262

[56] References Cited
UNITED STATES PATENTS 3,866,133  2/1975  Debloois et al..................... 329/104
3,906,376  9/1975  Bass................................... 329/104
3,919,651  11/1975 Le Mouel .......................... 329/122
3,925,732  12/1975 Tanaka et al....................... 329/104

Primary Examiner—John Kominski
Attorney, Agent, or Firm—Howard R. Greenberg; Robert J. Crawford

[57] ABSTRACT

Phase detection in a phase lock loop circuit is performed by periodically sampling the A. C. carrier communication signal applied thereto in response to a sample timing signal having a periodic frequency twice that of the carrier and a polarity check signal which is indicative of the polarity of the communication signal at a predetermined interval prior to each sample timing signal, one polarity enabling a sample to be taken and the opposite polarity inhibiting it.

13 Claims, 2 Drawing Figures

PHASE DETECTION IN PHASE LOCK LOOP CIRCUIT

BACKGROUND OF THE INVENTION

The present invention pertains generally to phase detection in phase lock loop circuits and specifically to a means particularly suited for A. C. carrier recovery in connection with coherent phase shift keying modulation.

As is well known, coherent phase shift keying (PSK) modulation, viz. transmitting binary information by reversing the phase of an A. C. carrier signal produces a communication signal which no longer has a recognizable continuous A. C. carrier at the receiver. Consequently, demodulation cannot be performed until a local reference signal at the receiver is provided against which the communication signal can be compared. Although there are well known circuits such as the Costas and Squaring Loop which perform this function, they do so only by degrading the signal-to-noise ratio of the communication signal by at least 6 dB.

With the foregoing in mind, it is a primary object of the present invention to provide a new and improved phase detection means for use in a phase lock loop circuit.

It is a further object of the present invention to provide such a new and improved phase detection means which is particularly suited for use in recovering the A. C. carrier signal in connection with coherent phase shift keying demodulation.

It is still a further object of the present invention to provide such a new and improved phase detection means which introduces less signal-to-noise degradation than heretofore.

These objects, as well as others and the means by which they are achieved through the present invention may best be appreciated by referring to the Detailed Description of the Invention which follows hereinafter together with the appended drawings.

BRIEF DESCRIPTION OF THE INVENTION

In accordance with the stated objects, the present invention performs phase detection in a phase lock loop circuit by sampling the A. C. carrier communication signal applied thereto periodically along the same slope during each A. C. cycle so as to generate a phase error signal of consistent polarity for maintaining or acquiring phase lock irrespective of phase reversals in the communication signal. Sampling is performed by generating a sample timing signal periodically at twice the frequency of the carrier signal. Before applying each sample timing signal to implement the taking of a sample (whose value is held until the next sample is taken), the polarity of the communication signal is checked at a predetermined interval prior thereto which is less than one carrier alternation. The determination of one polarity enables the sample timing signal to be applied to permit a sample to be taken, while an opposite polarity determination inhibits sampling from taking place.

In the preferred embodiment described herein, the polarity determination is accomplished by integrating the communication signal over each entire alternation of the carrier signal and converting it to a bilevel polarity check signal indicative of polarity which is sampled and stored at the end of each integration. Sampling of the communication signal is accomplished by first integrating it over each half cycle between signal peaks and then sampling the integrated value if the bilevel polarity check signal is of one level and omitting the sampling if it is of the other level. In this case, the aforementioned predetermined interval between the coincident polarity check and subsequent sample timing signals which control sampling is equal to a period of one half that of the carrier alternation.

DETAILED DESCRIPTION OF THE INVENTION

Figure 1:
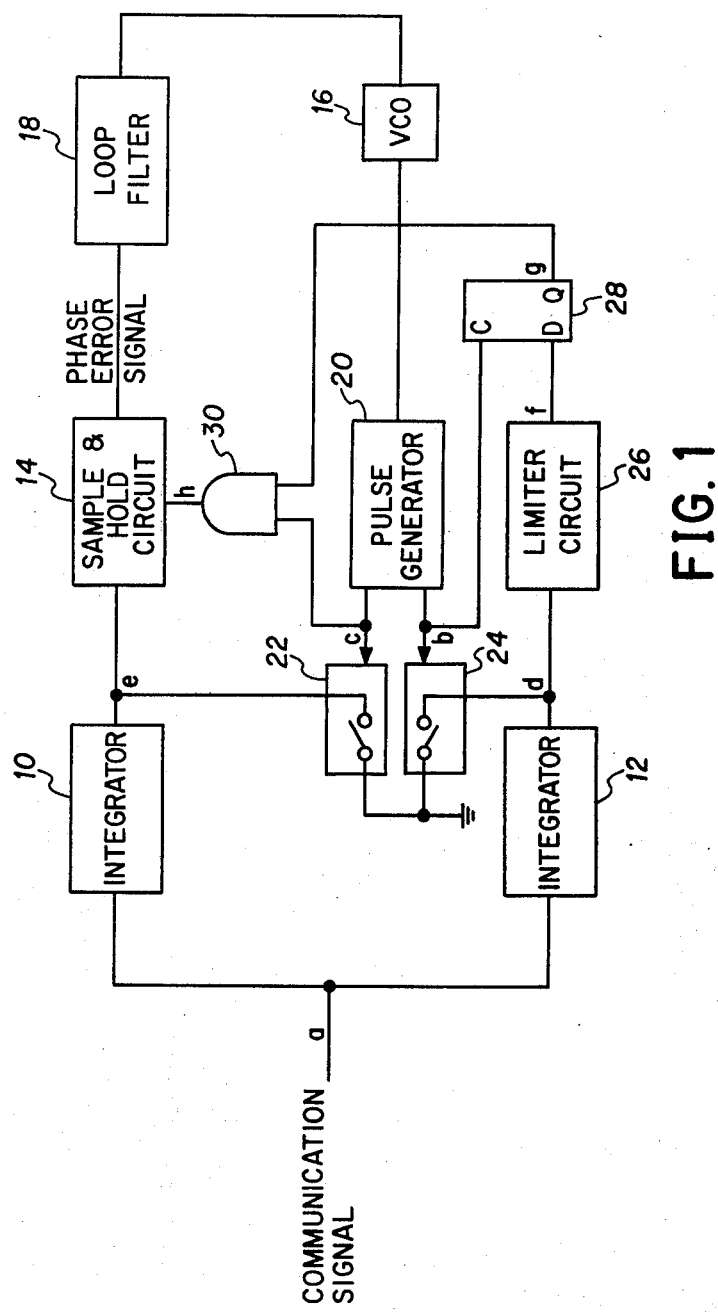
FIG. 1 is a block diagram of the preferred embodiment of the invention.
Figure 2:
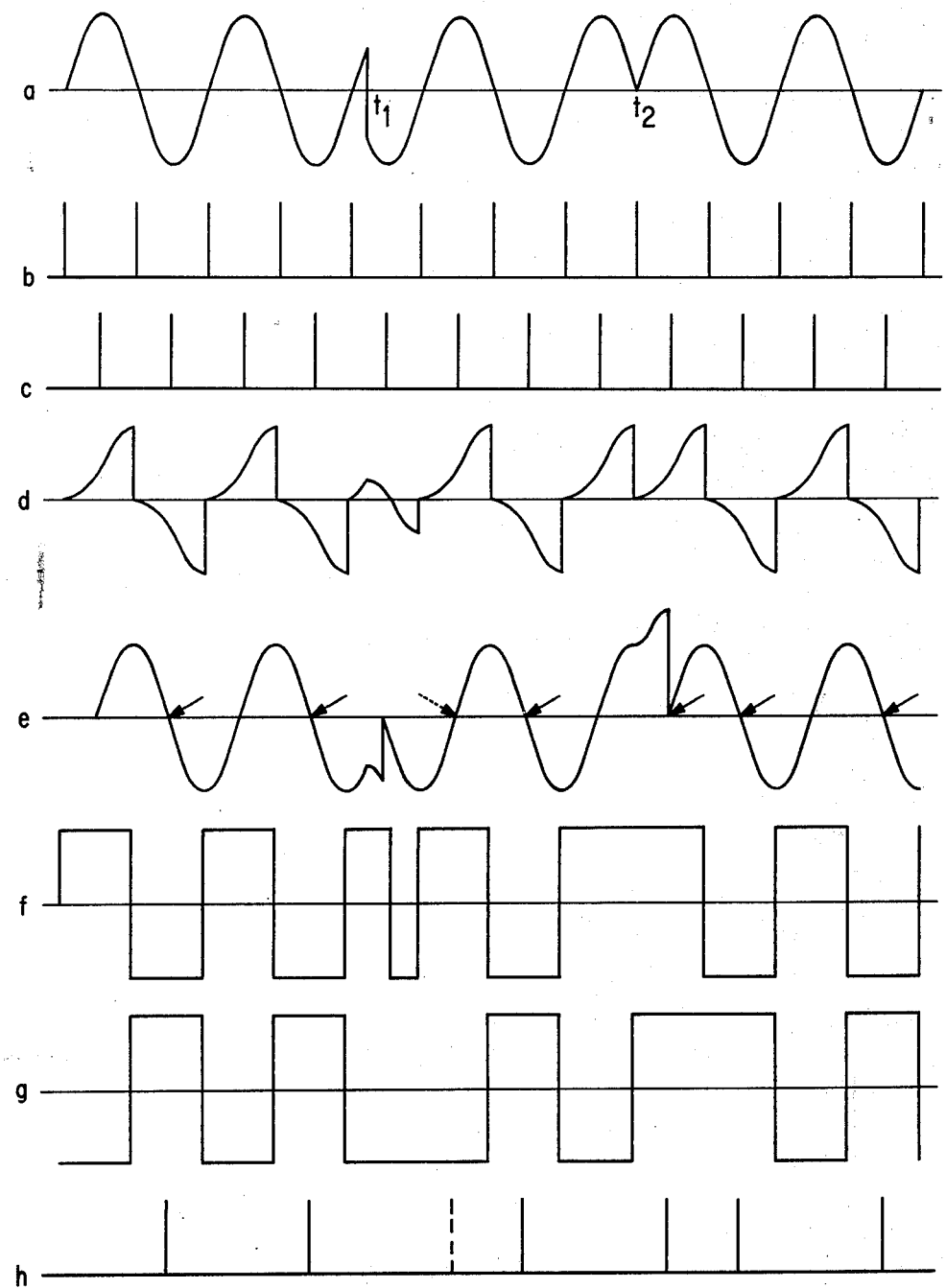
FIG. 2 presents a set of waveforms which will be helpful in explaining the operation of the invention depicted in FIG. 1.

As shown in FIG. 1, the preferred embodiment of the invention comprises a pair of integrators 10 and 12 which may be of any well known type such as a properly connected operational amplifier, to which is applied an A. C. carrier communication signal such as that designated as waveform a in FIG. 2. Waveform a represents a coherent phase shift keying modulated signal wherein the desired information is encoded in phase reversals like those depicted at $t_1$ and $t_2$. The output of integrator 10 is connected to a sample and hold circuit 14 whose output provides a phase error signal for controlling the operation of a voltage controlled oscillator (VCO) 16 via a loop filter 18 which comprise a conventional phase lock loop circuit. Sample and hold circuit 14 can take any one of well known forms for transferring an analog signal at its input to its output when enabled and then maintaining the signal at the output until next enabled. Such a sample and hold circuit is disclosed by U.S. Pat. No. 3,866,133 entitled "Digital Frequency-Phase Discrimination Circuit."

The output of VCO 16 controls the operation of a pulse generator 20 which produces two output pulse trains, b and c, having a periodic frequency twice that of the A. C. carrier and being out-of-phase with one another by a period equal to one half that of the carrier alternation, an alternation being equal to the half cycle of an A. C. wave in which the varying A. C. value has a singular polarity. Pulse train c controls the operation of a switching circuit 22 which momentarily connects the output of integrator 10 to ground when activated by a pulse applied thereto. Switching circuit 22 is represented symbolically herein since there are many well known devices, particularly electronic ones such as F.E.T.'s, which can be used to implement the required function, as will be readily apparent to those skilled in the art. Pulse train b, in a like manner, controls the operation of a similar switching circuit 24 which momentarily grounds the output of integrator 12 whenever a pulse is applied thereto. Thus, each integrator, 10 and 12, integrates the communication signal illustrated by waveform a, whenever its associated switching circuit, 22 and 24, respectively, is open which of course will be true between pulses in the associated pulse train. The integrated outputs of integrators 12 and 10 appear respectively as waveforms d and e. Since all signals are referenced to ground, it will be observed that each integration begins afresh following the momentary closure of the associated switch which initializes the integrated output to zero.

The analog output (waveform d) of integrator 12 is applied to a limiter circuit 26, such as a Schmitt trigger, to provide a bilevel signal (waveform $f$) whose level is a function of the polarity of the integrated signal output of integrator 12. The output of limiter circuit 26 is applied to the D input of a D-type flip-flop 28 which has its C input connected to receive pulse train $b$ from pulse generator 20. Thus, each time a pulse appears in pulse train $b$, the signal level appearing at the D input of flip-flop 28 is transferred to its Q output (shown by waveform $g$) where it is stored until the next $b$ pulse occurs. The Q output of flip-flop 28 provides one of the two inputs to an AND gate 30 whose output (waveform $h$) is connected to the sample and hold circuit 14 for controlling its operation. The second input to AND gate 30 is derived from the pulse train $c$ output of pulse generator 20.

A high level output for AND gate 30 constitutes a sample enable signal which directs the sample and hold circuit 14 to sample the output of integrator 10 while a low level output inhibits sampling from taking place. Thus, each time a pulse occurs in pulse train $c$, which constitutes a sample timing signal, AND gate 30 produces a high level output for enabling a sample to be taken, so long as the Q output of flip-flop 28 is high. The Q output of flip-flop 28 will be high coincident with a sample timing pulse only if the output of limiter circuit 26 was high at the time of occurrence for the immediately preceding pulse in pulse train $b$, one half of the carrier alternation period prior thereto. This would occur if the output of integrator 12 was positive at the time indicating a positive A. C. alternation. Otherwise, it would be negative indicating a negative A. C. alternation. Thus, the Q output of flip-flop 28 provides a bilevel polarity check signal at the time a sample timing pulse occurs indicative of the communication signal polarity at an interval of one-half A. C. carrier alternation period prior thereto. Requiring the coincidence of a sample timing pulse and a positive polarity check signal to initiate sampling, assures that the communication signal is sampled on the same slope of the A. C. cycle to produce a phase error signal which is consistent in polarity for maintaining or acquiring phase lock. For example, looking at the first two cycles of waveform $a$, which reflects a phase lock condition, it is seen that the second and fourth pulses in pulse train $c$ give rise to a sample enable signal since the output of flip-flop 28 is high coincident therewith, indicating that the polarity determination made prior thereto (the interval being one half of the carrier alternation period) was positive. The samples, which are indicated by the arrows of waveform $e$, occur on the negative slope of waveform $e$ so that even if their values were slightly different from zero, as would ordinarily be true in actual operation, the resultant phase error signal would be consistent in polarity for maintaining stable operation. On the other hand, the first and third pulses of pulse train $c$ do not give rise to a sample enable signal since the Q output of flip-flop 28 coincident therewith is negative indicating that the polarity determination made prior thereto (also one half of the carrier alternation period) was negative. Integrating the communication signal before sampling it is desirable since this not only provides a delay which permits the samples to be taken at the approximate zero crossings, but averages the energy during the half cycle integration period so as to improve the signal-to-noise performance. The latter is also true for the integrational manner in which the polarity determination is made via integrator 12. Although as may be appreciated, the entire half cycle period need not be used for integration, doing so is desirable to optimize performance. Should phase lock be lost as a result of a departure from frequency correspondence between VCO 16 and the communication signal, then the sample enable signal will of course occur to the left or right of the zero crossings dependent on the relative frequencies so as to produce a phase error signal other than zero but consistent in polarity which will change the frequency of the VCO 16 to conform to that necessary to reacquire phase lock.

It will be noticed that following a phase reversal in the communication signal at $t_1$, the sample timing signal (waveform $c$) subsequent thereto which in the absence of a phase reversal would have given rise to a sample enable signal (indicated by the dashed pulse in waveform $h$) does not do so, being inhibited by the Q output of flip-flop 28. Thus, this sample which would have erroneously occurred on the A. C. cycle positive slope rather than negative is omitted so that the output of the sample and hold circuit 14 remains at its previous value making it appear that no change has occurred. On the other hand, the phase reversal at $t_2$ does give rise to a subsequent erroneous sample which is not inhibited so that it does occur on the A. C. cycle positive slope. The misleading phase error signal resulting therefrom has no noticeable effect, however, on the operation of the VCO 16 since it is present only very briefly in relation to the inherent time delay encountered in phase lock loop circuits. Analysis of its operation will indicate that these erroneous samples will not be inhibited for phase reversals which occur in the communication signal between 90° and 270°. This is not considered a problem, however, since the A. C. carrier frequency is normally much higher than the baud rate and therefore the filtering action of the phase lock loop circuit more than offsets any adverse effects which might otherwise flow from these relatively infrequent erroneous samples.

As the foregoing detailed description demonstrates, the phase detection means of the invention is highly suitable for coherent phase shift keying demodulation since it is capable of recovering the A. C. carrier whose identity in the communication signal has been emasculated by the inherent phase reversals. Moreover, measurements of the preferred embodiment disclosed herein indicate that for most applications the signal-to-noise degradation introduced is no more than 1 dB as compared with 6 dB for prior art techniques. Since undoubtedly modifications to the foregoing detailed description will be readily apparent to those skilled in the art which may not constitute departures from the scope and spirit of the invention, the preferred embodiment described herein is to be considered exemplary and not circumscriptive of the invention which will now be claimed hereinbelow.

What is claimed is:
1. A phase detector for use in a phase lock loop circuit to which is applied an A. C. carrier communication signal, comprising:
   sampling means for sampling the communication signal and holding the sampled value until the next sample when enabled;
   means for generating a sample timing signal at a periodic frequency twice that of the carrier;
   polarity check means for determining the polarity of the communication signal prior to each sample timing signal at a predetermined interval which is less than one carrier alternation, and gating means for enabling said sampling means in response to each sample timing signal when the immediately preceding polarity determination is of one pole and inhibiting said sampling means when the determination is of the other pole.

2. The phase detector of claim 1 wherein said polarity check means includes integrating means for integrating the communication signal during each alternation to provide a bilevel signal indicative of its polarity which is checked at the end of each integration.

3. The phase detector of claim 2 wherein the integration is performed over each entire alternation.

4. The phase detector of claim 3 wherein said sampling means includes means for delaying the communication signal by an amount equal to said predetermined interval prior to sampling it.

5. The phase detector of claim 4 wherein said predetermined interval is equal to one half of the carrier alternation period and said delaying means is an integrator which integrates the communication signal over each half cycle between signal peaks.

6. A method of phase detecting in a phase lock loop circuit to which is applied an A. C. carrier communication signal, comprising:
sampling the communication signal and holding the sampled value until the next sample in response to a sample enable signal;
generating a sample timing signal periodically at a frequency twice that of the carrier;
determining the polarity of the communication signal prior to each sample timing signal at a predetermined interval which is less than one carrier alternation, and
generating a sample enable signal coincident with a sample timing signal when the immediately preceding polarity determination is of one pole and inhibiting its generation when the determination is of the other pole.

7. The method of claim 6 wherein said polarity determination is performed by integrating the communication signal during each alternation to provide a bilevel signal indicative of its polarity which is checked at the end of each integration.

8. The method of claim 7 wherein the integration is performed over each entire alternation.

9. The method of claim 7 including delaying the communication signal by an amount equal to said predetermined interval before sampling it.

10. The method of claim 9 wherein said predetermined interval is equal to one half of the carrier alternation period and said delaying is performed by integrating the communication signal each half cycle between signal peaks.

11. A phase detector for use in a phase lock loop circuit to which is applied an A. C. carrier communication signal, comprising:
means for generating a sample timing signal periodically at a frequency twice that of the carrier;
first integration means for integrating the communication signal over each half cycle between signal peaks;
first sampling means for sampling the output of said first integration means and holding the sampled value until the next sample when enabled;
second integration means for integrating the communication signal over each carrier alternation;
limiter means for converting the output of said second integration means to a bilevel signal, each level corresponding to a different polarity of output;
second sampling means for sampling the output of said limiter means and holding the sampled value until the next sample at the end of each carrier alternation, and
gating means for enabling said first sampling means in response to each sample timing signal when the output of said second sampling means is of one level and inhibiting said first sampling means when the output is of the other level.

12. A phase lock loop circuit to which an A. C. carrier communication signal is applied comprising:
sampling means for sampling the communication signal and holding the sampled value until the next sample when enabled;
means for generating a sample timing signal at a periodic frequency twice that of the carrier;
polarity check means for determining the polarity of the communication signal prior to each sample timing signal at a predetermined interval which is less than one carrier alternation;
gating means for enabling said sampling means in response to each sample timing signal when the immediately preceding polarity determination is of one pole and inhibiting said sampling means when the determination is of the other pole;
loop filter means for filtering the output of said sampling means, and
a voltage controlled oscillator responsive to the output of said loop filter means for controlling the operation of said generating means.

13. A phase lock loop circuit to which an A. C. carrier communication signal is applied, comprising:
means for generating a sample timing signal periodically at a frequency twice that of the carrier;
first integration means for integrating the communication signal over each half cycle between signal peaks;
first sampling means for sampling the output of said first integration means and holding the sampled value until the next sample when enabled;
second integration means for integrating the communication signal over each carrier alternation;
limiter means for converting the output of said second integration means to a bilevel signal, each level corresponding to a different polarity of output;
second sampling means for sampling the output of said limiter means and holding the sampled value until the next sample at the end of each carrier alternation;
gating means for enabling said first sampling means in response to each sample timing signal when the output of said second sampling means is of one level and inhibiting said first sampling means when the output is of the other level;
loop filter means for filtering the output of said first sampling means, and
a voltage controlled oscillator responsive to the output of said loop filter means for controlling the operation of said generating means.

* * * * *